United States Patent [19]

Yasukawa et al.

[11] Patent Number: 4,722,063
[45] Date of Patent: Jan. 26, 1988

[54] METHOD OF CALCULATING ACTUAL ARM LENGTHS AND COMPENSATING FOR ANGULAR ERRORS

[75] Inventors: Kazuyoshi Yasukawa; Yasuyuki Kitahara, both of Nagano, Japan

[73] Assignee: Kabushiki Kaisha Sankyo Seiki Seisakusho, Nagano, Japan

[21] Appl. No.: 793,418

[22] Filed: Oct. 31, 1985

[30] Foreign Application Priority Data

Oct. 31, 1984 [JP] Japan .................................. 59-231032

[51] Int. Cl.$^4$ ............................................. G05B 19/42
[52] U.S. Cl. .................................... 364/513; 364/192; 901/3; 901/17
[58] Field of Search ............... 364/191, 192, 170, 474, 364/475, 513; 318/568; 901/14–18, 3

[56] References Cited

U.S. PATENT DOCUMENTS

| | | | |
|---|---|---|---|
| 4,281,385 | 7/1981 | Nakaso | 364/474 |
| 4,400,118 | 8/1983 | Yamakage | 364/474 |
| 4,456,961 | 6/1984 | Price | 364/191 |
| 4,481,592 | 11/1984 | Jacobs | 364/191 |
| 4,495,588 | 1/1985 | Nio | 364/513 |
| 4,511,985 | 4/1985 | Inaba | 364/513 |
| 4,517,653 | 5/1985 | Tsuchihashi | 364/513 |
| 4,562,392 | 12/1985 | Davis | 364/513 |
| 4,583,159 | 4/1986 | Kanemoto | 364/170 |
| 4,613,943 | 9/1986 | Miyake | 364/191 |

Primary Examiner—Jerry Smith
Assistant Examiner—Allen MacDonald
Attorney, Agent, or Firm—Sughrue, Mion, Zinn, Macpeak & Seas

[57] ABSTRACT

A method of positioning a planar multi-joint industrial robot in which errors due to manufacturing tolerances and errors in the manufacture of the robot are prevented from affecting the accuracy of the movements of the robot in actual use. The coordinate system of a measuring plate is first made to agree with one axis of the coordinate system of the robot by teaching, and the coordinates of four points on the measuring plate are taught to the robot. The actual arm lengths of two arms of the robot are obtained, and an angle of one of the arms relative to an extension of the other arm on the basis of the four coordinates is determined. Dimensions of the robot to the actual arm lengths and this angle are then corrected, and two reference points of the object are taught to the robot to obtain an inclination between the coordinate systems of the object and the robot. The coordinate system of the robot is corrected with the inclination to thereby obtain the position of the object. In a control unit of the robot are stored the actual arm lengths and the inclination as well as the position coordinates as correction values.

4 Claims, 7 Drawing Figures

METHOD OF CALCULATING ACTUAL ARM LENGTHS AND COMPENSATING FOR ANGULAR ERRORS

BACKGROUND OF THE INVENTION

The present invention relates to a method of positioning a planar multi-joint industrial robot.

Conventionally, repetitive accuracy in practical work, specifically, in braking for positioning such a robot, has been regarded as of major importance. This is because, after the initial positioning of the robot has been performed by teaching, normal working movement is carried out as taught.

Recently, however, since a computer-aided design technique has been widely used, it has become necessary to perform point designation on a moving locus using absolute coordinates without effecting the teaching work. Even if point designation using such coordinates is effected, there has been a limit in positioning accuracy due to the accumulation of errors in the arm lengths of the robot and errors of various parts occurring during the assembling of the robot.

A technique for ensuring the positioning accuracy of the robot is disclosed in an article "Method of Measuring Various Dimensions of Robots by Teaching" in the papers of the Autumn 1981 Meeting of the Japan Society of Precision Engineering. The article discloses that the actual dimensions after the robot has been assembled are used so as to cancel errors caused in the process of assembling the robot to thereby improve the positioning accuracy during the actual movement of the robot. Even if the errors at the robot side are corrected, however, it is impossible to ensure sufficient positioning accuracy in actual work because the relative positional relation between the coordinate systems of the workpiece object and the robot cannot be accurately maintained in practical use.

On the other hand, generally the coordinate system of the robot does not coincide with the coordinate system of the object when the robot is located at the working position. A technique making the coordinate systems agree with each other and wherein input is effected in the coordinates of the object has been proposed in Japanese Unexamined Patent Publication No. 60507/1984. According to this technique, the teaching work is simplified so as to shorten the teaching time.

As described above, however, because the accuracy of the robot is not sufficient, high positioning accuracy cannot really be ensured.

An object of the present invention is thus to ensure high positioning accuracy, even for an input employing an absolute coordinate system, by correctly determining errors in the process of assembling the robot and the relative positional relation between the robot and the object for work by the robot in actual use.

According to the present invention, during the assembling of the robot, the arm lengths and the angle at the junction portions of the arm are obtained by measurement and stored as correction values, and in setting up the robot, amounts of offset and inclination between the respective coordinate systems of the robot and the workpiece object at various points are obtained by measurement and stored as further correction values, whereby the data of the operating program for the robot is corrected by these two types of correction values so as to actuate the robot to operate on the basis of the corrected data. When such correction is performed, data for an operating point of the robot can be input in the rectangular coordinate system of the object, and, moreover, high positioning accuracy can be realized without performing teaching work.

DESCRIPTION OF THE PREFERRED EMBODIMENTS

Figure 1:
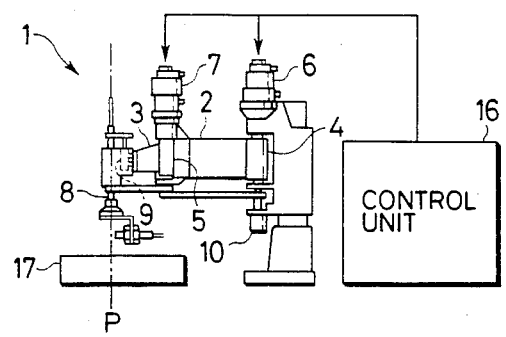
FIG. 1 is a side view showing a planar multi-joint robot.

An industrial robot constructed in accordance with the present invention is a planar multi-joint robot. FIG. 1 shows such a robot 1. The robot 1 is provided with two joints, that is, a first arm 2 and a second arm 3. The first and second arms 2 and 3 are supported respectively by vertical shafts 4 and 5, each in such a manner so as to be capable of turning in a plane, the arms being driven by driving motors 6 and 7 provided on the shafts 4 and 5, respectively. The driving motors 6 and 7 are controlled by a control unit 16. The second arm 3 is provided at its end portion with a vertically extending shaft 8 which is made vertically movable, for example, by a pneumatic cylinder 9 and which is made rotatable by an operating motor 10. The center of the vertically moving shaft 8 is an operating point P.

Next, referring to FIGS. 2 to 7, a positioning method according to the present invention will be specifically described.

Figure 7:
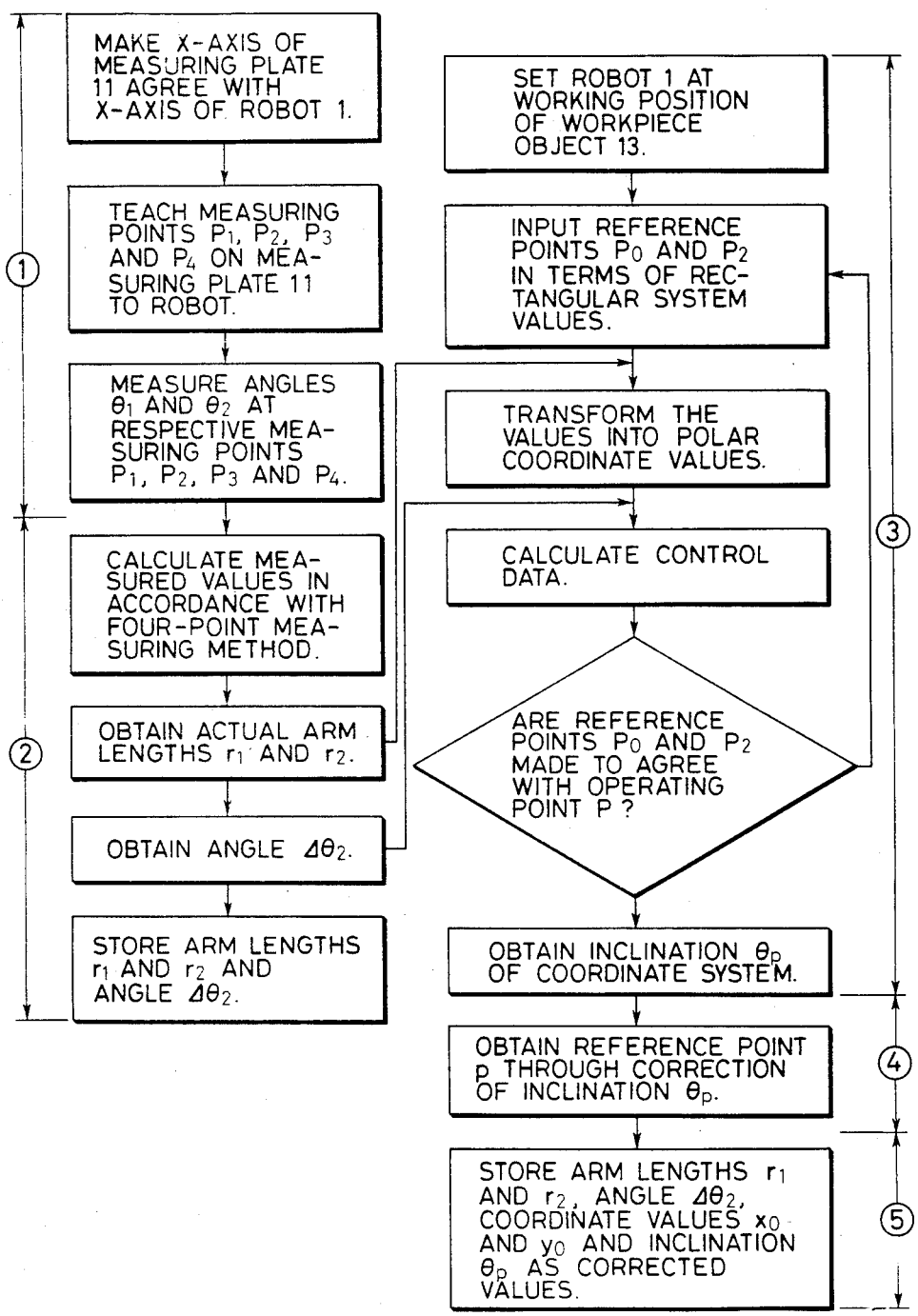
FIG. 7 is a flowchart illustrating a positioning method.

Paragraphs (1) to (5) in the following description describe various steps of the positioning method according to the present invention, corresponding to flowchart of FIG. 7.

Initially, in a step in which the robot 1 is assembled, the arm length $r_1$ of the first arm 2, the arm length $r_2$ of the second arm 3, and an angle $\Delta\theta_2$ formed between the first and second arms 2 and 3 at the shaft 5 are measured.

(1) first, an X-Y rectangular coordinate system of a measuring plate 11 is made to agree with one axis of an X-Y rectangular coordinate system of the robot 1 by teaching. In such a state, the respective coordinates of four measuring points $P_1$, $P_2$, $P_3$, and $P_4$ on the measuring plate 11 are taught to the robot 1, and the angles $\theta_1$ and $\theta_2$ are measured. Here the angles $\theta_1$ and $\theta_2$ are respective rotational angles of the first arm 2 and the second arm 3 in the teaching state.

Figure 2:
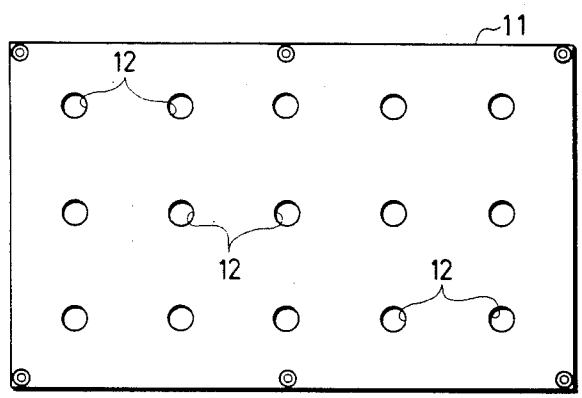
FIG. 2 is a plan view showing a measuring plate.
Figure 3:
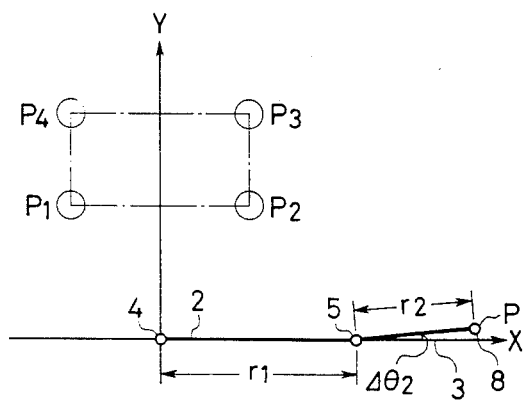
FIGS. 3 and 4 are diagrams used for explaining a four-point measuring method.

As shown in FIG. 2, measuring apertures 12 are formed with high accuracy in the measuring plate 11. FIG. 3 shows a state in which the X-axis of the robot 1 is caused to agree with the X-axis of the measuring plate 11 by way of example. Such a state may be effected by, for example, placing the measuring plate 11 on an X-Y table 17, moving it in the direction of the X-axis or the Y-axis, and, as required, rotating it relatively on an axis perpendicular to the plane.

The four measuring points $P_1$, $P_2$, $P_3$ and $P_4$ are set at positions corresponding to four corner portions of a rectangular. After setting them in such a manner, the center of the vertically movable shaft 8 of the robot 1, that is, the operating point P, is caused to agree with each measuring point $P_1$, $P_2$, $P_3$ and $P_4$ by the teaching operation, and the angles $\theta_1$ and $\theta_2$ at that time are measured by the respective numbers of pulses issued from the driving motors 6 and 7.

Figure 5:
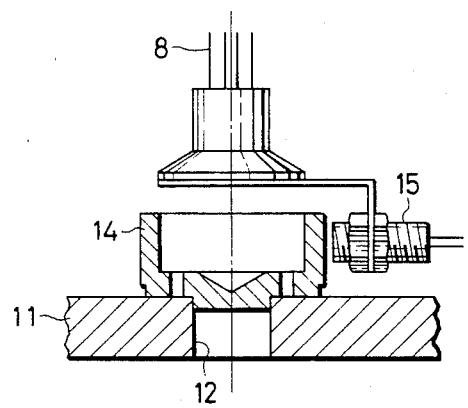
FIG. 5 is a side view showing a positioning device.

Such positioning can be performed with high accuracy using, as shown in FIG. 5, a sensor 15, attached to the vertically movable shaft 8, which is rotated relative to an annular object to be detected 14 inserted at the measuring points $P_1$, $P_2$, $P_3$ and $P_4$ with the changes in output waveforms during rotation being measured.

(2) Next, the actual arm length $r_1$ of the first arm 2, the actual arm length $r_2$ of the second arm 3, and the angle $\Delta\theta_2$ formed between an extension of the first arm 2 and the second arm 3 are calculated from the angles $\theta_1$ and $\theta_2$ at the points $P_1$, $P_2$, $P_3$ and $P_4$. Such calculation may be automatically performed by execution of a "four point measuring method" program.

Generally, the operating point P of the robot 1 is expressed in polar coordinates as follows:

$$P = r_1 e^{j(\theta_1)} + r_2 e^{j(\theta_1 + \theta_2)}$$

If the above equation is held with respect to each of the measuring points $P_1$, $P_2$, $P_3$ and $P_4$, the respective arm lengths $r_1$ and $r_2$, and the angle $\theta_2$ can be obtained from the relation $P_3 - P_2 = P_4 - P_1$, or the like.

Figure 4:
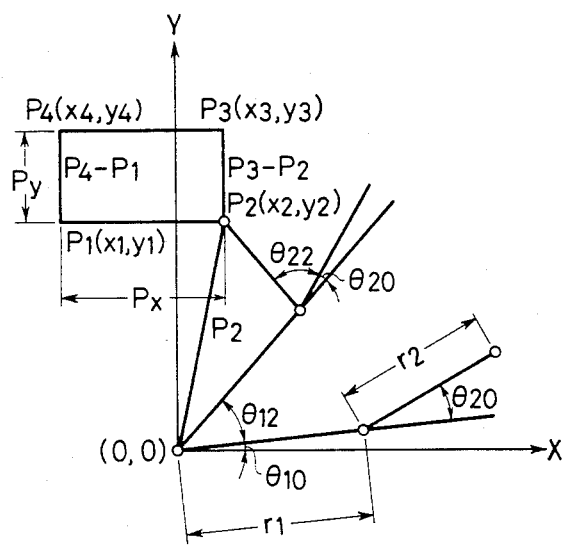

The following formulas provide a general example for FIG. 4:

$$P_1 = (x_1, y_1)$$
$$= r_1 e^{j(\theta_{10} + \theta_{11})} + r_2 e^{j(\theta_{10} + \theta_{11} + \theta_{20} + \theta_{21})}$$

$$P_2 = (x_1 + P_x, y_1)$$
$$= r_1 e^{j(\theta_{10} + \theta_{12})} + r_2 e^{j(\theta_{10} + \theta_{12} + \theta_{20} + \theta_{22})}$$

$$P_3 = (x_1 + P_x, y_1 + p_y)$$
$$= r_1 e^{j(\theta_{10} + \theta_{13})} + r_2 e^{j(\theta_{10} + \theta_{13} + \theta_{20} + \theta_{23})}$$

$$P_4 = (x_1, y_1 + p_y)$$
$$= r_1 e^{j(\theta_{10} + \theta_{14})} + r_2 e^{j(\theta_{10} + \theta_{14} + \theta_{20} + \theta_{24})}$$

Of the subscripts of the angles $\theta$, the leading digits "1" and "2" correspond to the first and second arms 2 and 3 respectively, while the second digits "1", "2", "3" and "4" correspond to the measuring points $P_1$, $P_2$, $P_3$ and $P_4$, respectively.

$$P_3 - P_2 = P_4 - P_1$$

$$r_1 e^{j(\theta_{10} + \theta_{13})} + r_2 e^{j(\theta_{10} + \theta_{13} + \theta_{20} + \theta_{23})} -$$
$$r_1 e^{j(\theta_{10} + \theta_{12})} - r_2 e^{j(\theta_{10} + \theta_{12} + \theta_{20} + \theta_{22})} =$$
$$r_1 e^{j(\theta_{10} + \theta_{14})} + r_2 e^{j(\theta_{10} + \theta_{14} + \theta_{20} + \theta_{24})} -$$
$$r_1 e^{j(\theta_{10} + \theta_{12})} - r_2 e^{j(\theta_{10} + \theta_{12} + \theta_{20} + \theta_{22})},$$

$$r_1 (e^{j(\theta_{13})} - e^{j(\theta_{12})}) +$$
$$r_2 (e^{j(\theta_{13} + \theta_{20} + \theta_{23})} - e^{j(\theta_{12} + \theta_{20} + \theta_{22})}) =$$
$$r_1 (e^{j(\theta_{14})} - e^{j(\theta_{11})}) +$$
$$r_2 (e^{j(\theta_{14} + \theta_{20} + \theta_{24})} - e^{j(\theta_{11} + \theta_{20} + \theta_{21})})$$

Here, for the sake of simplicity, the following substitution is performed:

$$e^{j(\theta_{13})} - e^{j(\theta_{12})} - e^{j(\theta_{14})} + e^{j(\theta_{11})} =$$
$$K_1 e^{j(\theta_1)}, \quad -e^{j(\theta_{13} + \theta_{23})} + e^{j(\theta_{12} + \theta_{22})} + e^{j(\theta_{14} + \theta_{24})} -$$
$$e^{j(\theta_{11} + \theta_{21})} = K_2 e^{j(\theta_2)}, \quad r_1 K_1 e^{j(\theta_1)} = r_2 e^{j(\theta_{20})} \cdot K_2 e^{j(\theta_2)}$$

Thus, the following equations can be obtained.

$$r_2/r_1 = K_1/k_2$$

$$\theta_{20} = \theta_1 - \theta_2$$

On the other hand, the following equations can be obtained from the relation $P_2 - P_1 = P_x$.

$$P_x e^{-j(\theta_{10})} = r_1(e^{j(\theta_{12})} - e^{j(\theta_{11})}) +$$
$$r_2(e^{j(\theta_{12} + \theta_{20} + \theta_{22})} - e^{j(\theta_{11} + \theta_{20} + \theta_{21})}), \quad e^{j(\theta_{12})} - e^{j(\theta_{11})} = K_3 e^{j(\theta_3)},$$
$$e^{j(\theta_{12} + \theta_{20} + \theta_{22})} - e^{j(\theta_{11} + \theta_{20} + \theta_{21})} = K_4 e^{j(\theta_4)},$$
$$P_x e^{-j(\theta_{10})} = r_1 \cdot K_3 e^{j(\theta_3)} + r_2 \cdot K_4 e^{j(\theta_4)}$$
$$= r_1 \cdot K_3 e^{j(\theta_3)} + r_1 \cdot K_1/K_2 \cdot K_4 e^{j(\theta_4)},$$
$$K_3 e^{j(\theta_3)} + K_1 \cdot K_4 e^{j(\theta_4)}/K_2 = K_5 e^{j(\theta_5)},$$
$$p_x e^{-j(\theta_{10})} = r_1 \cdot K_5 e^{j(\theta_5)}$$

Thus, the target values can be obtained as follows:

$$r_1 = p_x/K_5$$

$$r_2 = p_x \cdot K_1/K_5 \cdot K_2$$

$$\theta_{10} = -\theta_5$$

Moreover, the target values may be obtained by using the value of $P_y$ as follows:

$$P_4 - P_1 = P_y$$

$$P_y e^{-j(\theta_{10})} = r_1(e^{j(\theta_{14})} - e^{j(\theta_{11})}) +$$
$$r_2(e^{j(\theta_{14} + \theta_{20} + \theta_{24})} - e^{j(\theta_{11} + \theta_{20} + \theta_{21})}), \quad e^{j(\theta_{14})} - e^{j(\theta_{11})} = K_3' e^{j(\theta_3')},$$
$$e^{j(\theta_{14} + \theta_{20} + \theta_{24})} - e^{j(\theta_{11} + \theta_{20} + \theta_{21})} = K_4' e^{j(\theta_4')},$$
$$K_3' e^{j(\theta_3')} K_1 K_4' e^{j(\theta_4')}/K_2 = K_5' e^{j(\theta_5')},$$
$$P_y e^{-j(\theta_{10})} = r_1 K_5' e^{j(\theta_5')}$$

Thus, the target values can be obtained as follows:

$$r_1 = p_y/k_5'$$

$$r_2 = p_y \cdot K_1/K_5' \cdot K_2$$

Because the X-axes agree with each other according to the present invention, the angle $\theta_{10}$ is zero and the angle $\theta_{20}$ corresponds to the angle $\theta_2$ in the above equations.

The thus-obtained values of the arm lengths $r_1$ and $r_2$ and the angle $\theta_2$ are stored in the control unit 16. Thus, even if accumulative errors are caused among the respective parts of the shaft 1 in the assembling of the robot 1, the errors are corrected by the above mentioned values so that high positioning accuracy is ensured during movement of the robot 1 when performing actual work.

Next, after the robot 1 is set up in an actual working position, the relative relation between the positions of the robot 1 and an object 13 are corrected.

(3) First, the robot 1 is set up at the actual working position and the object 13 is fixed at a predetermined position in the positioning state. The dimensions of the robot 1 are corrected into the above-mentioned values of the lengths of the arms $r_1$ and $r_2$ and the angle $\Delta\theta_2$, the robot 1 is taught two reference points $p_0$ and $p_1$ of the object 13, and the inclination $\theta_p$ of the x-y coordinate system of the object 13 relative to the x-y rectangular coordinate system of the robot 1 is obtained.

Figure 6:
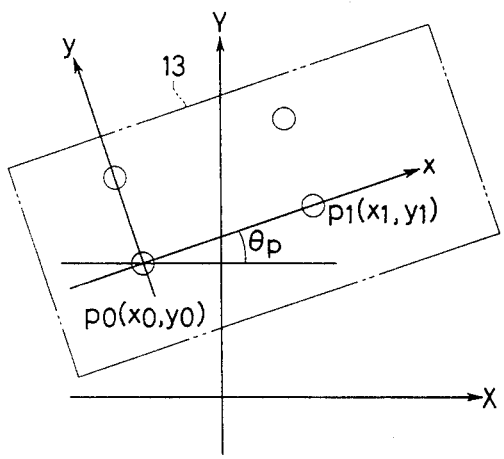
FIG. 6 is a diagram used for explaining a state in measuring the inclination between the respective coordinate systems of the robot and the object.

That is, in the step in which the robot 1 and the object 13 are set in their working positions, as shown in FIG. 6, the relative positional relation between the x-y rectangular coordinate system of the robot 1 and the x-y rectangular coordinate system of the object 13 is determined. For this purpose, the two reference points $p_1$ and $p_2$ are determined. Then, the above-mentioned reference points $p_0$ and $p_1$ are taught to the robot 1, corrected with the above-mentioned values of the arm lengths $r_1$ and $r_2$ and the angle $\theta_2$. This teaching is performed by entering numerical values corresponding to the rectangular coordinate values $p_0(x_0,y_0)$ and $p_1(x_1,y_1)$. At that time, control unit 16 receives the arm lengths $r_1$ and $r_2$ after the correction and transforms the above-mentioned numerical values into values in polar coordinates. Then, the control unit 16, in response to the angle $\Delta\theta_2$, calculates controlling data to obtain the respective numbers of the driving pulses of the shafts 4 and 5. Then, judgement is made as to whether the reference points $p_0$ and $p_1$ agree with the operating point P or not by movement of the robot 1. The teaching work is repeated until coincidence is obtained between the reference points $p_0$ and $p_1$ and the operating point P. When coincidence is obtained, the inclination $\theta_p$ between the respective coordinate systems of the positions of the robot 1 and the object 13 is defined by the following equation:

$$\theta_p = \tan^-((y_0-y_1)/(x_0-x_1))$$

(4) Next, the inclination of the coordinate system of the robot 1 is corrected by the value $\theta_p$ to make the coordinate system of the robot 1 agree with the coordinate system of the object 13. After such correction of inclination by $\theta_p$ has been effected, the point $p_0(x_0,y_0)$, which becomes the reference point of the object 13, is obtained.

(5) The thus-measured values of the arm lengths $r_1$ and $r_2$, the angle $\Delta\theta_2$, the inclination $\theta_p$, and the position coordinates $(x_0,y_0)$ are stored as corrected values in the control unit 16 of the robot 1.

Through such a process, the control unit 16 of the robot 1 corrects the errors in assembling the robot 1 and also corrects the offset between the X-Y rectangular coordinate system of the robot 1 and the x-y rectangular coordinate system of the object 13 in actual working positions.

Accordingly, when the robot 1 is operated thereafter, when any necessary input is entered in the x-y rectangular coordinate system of the object 13, the control unit 16 places the robot 1 in the movable state while performing positioning with high accuracy and while correcting errors made in assembling the robot 1 and/or positional offset between the positions of robot 1 and the object 13. That is, the positional data of movement of the robot 1 can be entered in the rectangular coordinates of the object 13. At that time, the control unit 16 receives the arm lengths $r_1$ and $r_2$ and the coordinates $(x_0,y_0)$, transforms the coordinates into polar coordinates, and calculates necessary rotational angles of the shaft 4 and 5 in the form of numbers of pulses. Further, the control unit 16 receives the angle $\Delta\theta_2$ and the inclination $\theta_p$, and calculates data for controlling the robot, that is, obtains the necessary number of driving pulses for the driving motors 6 and 7. In operating the robot 1, the control unit 16 supplies the driving motors 6 and 7 with the thus-obtained respective numbers of pulses as the data for the amount of rotation. The respective driving motors 6 and 7 of the robot 1 rotate the first and second arms 2 and 3 through the instructed angles so as to accurately position the center point of the vertically movable shaft 8 on the forward end of the second arm 3, that is, the operating point P, at a predetermined position.

According to the present invention, the following effects are obtained:

Because the correct dimensions of the components of the robot are obtained after the robot has been assembled, the errors of the respective parts in assembling the robot or the accumulated errors in assembling of the robot can be corrected.

Further, because the coordinate system of the robot and the coordinate system of the object are transformed by the teaching operation, the movement of the robot thereafter can be assigned on the basis of input data in the rectangular coordinate system of the object, and because the object can be positioned on the basis of the program provided in the robot, it is not required to effect a teaching operation every time positioning of the robot on the basis of the positioning data is required.

We claim:

1. A method of positioning a planar multi-joint robot operated with polar coordinates, comprising the steps of:

causing the coordinate system of a measuring plate to agree with one axis of the coordinate system of the robot;

teaching the coordinates of four points on said measuring plate to said robot;

obtaining actual arm lengths $r_1$ and $r_2$ of a first and a second arm of said robot and an angle $\Delta\Theta_2$ of said second arm relative to an extension of said first arm on the basis of the coordinates of said four points;

setting said robot at a working position and positioning an object;

operating said robot on the basis of said actual arm lengths $r_1$ and $r_2$ and said angle $\Delta\Theta_2$, and teaching two reference points of said object to said robot;

calculating an inclination $\Theta_p$ between the respective coordinate systems of said object and said robot on the basis of the two reference points of said object;

correcting said coordinate system of said robot with said inclination $\Theta_p$ to thereby obtain the position $p_0$ $(x_0,y_0)$ of said object; and storing, in a control unit of said robot, said actual arm lengths $r_1$ and $r_2$, said inclination $\Theta_p$ and position coordinates $x_0$ and $y_0$ as correction values to be used in positioning said robot to a predetermined position on the basis of input data in said coordinate system of said object.

2. The method of positioning a planar multi-joint robot according to claim 1, wherein said actual arm lengths $r_1$ and $r_2$ are obtained by a four-point measuring method.

3. The method of positioning a planar multi-joint robot according to claim 1, in which said positioning of said robot is accomplished using rectangular-coordinate inputs which are transformed into polar coordinates by said control unit.

4. The method of positioning a planar multi-joint robot according to claim 1, in which said positioning of said robot is accomplished using driving motors for the arms of said robot, pulses from said motors being used to determine the rotational angles between said arms.

* * * * *